United States Patent
Denby et al.

(10) Patent No.: US 8,824,313 B2
(45) Date of Patent: Sep. 2, 2014

(54) DATA COMPRESSION IN A DISTRIBUTED MONITORING SYSTEM

(75) Inventors: Lorraine Denby, Berkeley Heights, NJ (US); Colin L. Mallows, Flemington, NJ (US); Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1643 days.

(21) Appl. No.: 11/531,910

(22) Filed: Sep. 14, 2006

(65) Prior Publication Data

US 2008/0069334 A1    Mar. 20, 2008

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |

(52) U.S. Cl.
CPC ............ *H04L 12/2697* (2013.01); *H04L 43/50* (2013.01)
USPC ............ 370/252; 370/254; 370/392; 455/423

(58) Field of Classification Search
USPC .................... 370/254, 392; 455/423
See application file for complete search history.

(56) References Cited

U.S. PATENT DOCUMENTS

| | | | | |
|---|---|---|---|---|
| 6,490,530 | B1* | 12/2002 | Wyatt .............................. | 702/24 |
| 7,031,264 | B2 | 4/2006 | Adhikari et al. | |
| 7,328,262 | B2* | 2/2008 | McDonagh et al. .......... | 709/224 |
| 2002/0101943 | A1* | 8/2002 | Proctor, Jr. .................... | 375/346 |
| 2003/0065986 | A1* | 4/2003 | Fraenkel et al. ................ | 714/47 |
| 2003/0086425 | A1 | 5/2003 | Bearden et al. | |
| 2003/0091165 | A1 | 5/2003 | Bearden et al. | |
| 2003/0097438 | A1 | 5/2003 | Bearden et al. | |
| 2003/0135382 | A1* | 7/2003 | Marejka et al. .................... | 705/1 |
| 2004/0008727 | A1* | 1/2004 | See et al. ...................... | 370/469 |
| 2004/0062204 | A1 | 4/2004 | Bearden et al. | |
| 2004/0252694 | A1 | 12/2004 | Adhikari et al. | |
| 2005/0053009 | A1 | 3/2005 | Denby et al. | |
| 2005/0207410 | A1 | 9/2005 | Adhikari et al. | |
| 2006/0128371 | A1* | 6/2006 | Dillon et al. .................. | 455/423 |
| 2007/0133515 | A1* | 6/2007 | Kumar et al. ................. | 370/352 |
| 2007/0177598 | A1* | 8/2007 | Miyazaki et al. ............. | 370/392 |
| 2008/0037443 | A1* | 2/2008 | Ansari et al. .................. | 370/254 |
| 2008/0098446 | A1* | 4/2008 | Seckin et al. ................. | 725/114 |

OTHER PUBLICATIONS

B. Karacali et al., "Scalable Network Assessment for IP Telephony," Proceedings of the 2004 IEEE International Conference on Communications (ICC-04), pp. 1-14, 2004.

"Avaya ExpertNet™ Lite Assessment Tool," White Paper, 10 pages, Apr. 2005.

(Continued)

*Primary Examiner* — Hassan Phillips
*Assistant Examiner* — Lonnie Sweet

(57) ABSTRACT

A distributed monitoring system comprises a plurality of agents configured for communication with at least one central server. A given one of the agents obtains measurement data, and applies a statistical test to the measurement data. Based on a result of the statistical test, the given agent determines whether or not an update needs to be sent by the agent to the central server. The agent sends the update to the central server if the determination indicates that the update should be sent.

18 Claims, 2 Drawing Sheets

(56) References Cited

OTHER PUBLICATIONS

"Avaya ExpertNet™ VoIP Assessment Tool," White Paper, 13 pages, Sep. 2005.

C. Tang et al., "On the Cost-Quality Tradeoff in Topology-Aware Overlay Path Probing," Proceedings of the 11th IEEE Conference on Network Protocols (ICNP), 12 pages, Nov. 2003.

R. Kumar et al., "Efficient Beacon Placement for Network Tomography," IMC '04, Proceedings of the 4th ACM SIGCOMM Conference on Internet Measurement, ACM Press, 6 pages, Oct. 2004.

Y. Chen et al., "An Algebraic Approach to Practical and Scalable Overlay Network Monitoring," SIGCOMM '04, Proceedings of the 2004 Conference on Applications, Technologies, Architectures, and Protocols for Computer Communications, ACM Press, pp. 1-12, Aug.-Sep. 2004.

Y. Shavitt et al., "Computing the Unmeasured: An Algebraic Approach to Internet Mapping," IEEE Journal on Selected Areas in Communications, vol. 22, No. 1, pp. 67-78, Jan. 2004.

J.D. Horton et al., "On the Number of Distributed Measurement Points for Network Tomography," IMC '03, Proceedings of the 3rd ACM SIGCOMM Conference on Internet Measurement, ACM Press, 6 pages, Oct. 2003.

S. Jamin et al., "On the Placement of Internet Instrumentation," Proceedings of the IEEE Infocom 2000, 10 pages, 2000.

U.S. Appl. No. 11/536,229, filed Sep. 28, 2006, A. Adhikari et al., "Root Cause Analysis of Network Performance Based on Exculpation or Inculpation Sets."

Moshe Sidi, "Reality-based VoIP Readiness Testing using NetAlly® VoIP," Viola Networks, pp. 1-10, Apr. 2002.

Moshe Sidi, "Readying Your Network for VoIP: Get it Right the First Time," Viola Networks, pp. 1-9, Apr. 2002.

J.Q. Walker, "A Handbook for Successful VoIP Deployment: Network Testing, QoS, and More," NetIQ Corporation, pp. 1-13, 2002.

Y. Breitbart et al., "Topology Discovery in Heterogeneous IP Networks," Proceedings of IEEE Infocom 2000, 10 pages, Mar. 2000.

B. Huffaker et al., "Topology Discovery by Active Probing," CAIDA, 8 pages, 2002.

M.R. Meiss et al., "Standards-Based Discovery of Switched Ethernet Topology," Advanced Network Management Lab, pp. 1-20, Apr. 2002.

R. Siamwalla et al., "Discovering Internet Topology," Cornell University, pp. 1-16, Jul. 1998.

C. Perkins et al., "RTP Testing Strategies," Network Working Group, RFC 3158, pp. 1-21, Aug. 2001.

J.M. Chambers et al., "Monitoring Networked Applications with Incremental Quantile Estimation," Statistical Science, pp. 1-20, Jan. 2006.

U.S. Appl. No. 11/496,360, filed Jul. 31, 2006, B. Karacali-Akyamac et al., "Determination of Endpoint Device Location for Efficient Analysis of Network Performance."

* cited by examiner

DATA COMPRESSION IN A DISTRIBUTED MONITORING SYSTEM

FIELD OF THE INVENTION

The invention relates generally to distributed monitoring systems, and more particularly to techniques for controlling data transfer from distributed agents to one or more central servers in such a system.

BACKGROUND OF THE INVENTION

Distributed monitoring systems typically comprise multiple agents collecting data over time. The agents need to send reports or other types of updates periodically or upon request to a central server where the concentration of information may reveal important aspects of the system being monitored. Some examples of where this type of updating may be necessary include communication network monitoring and analysis, distributed call center monitoring, and monitoring of processing systems or sensor networks.

A problem that can arise in these and other distributed monitoring environments is that the transmission of reports or other updates from the distributed agents to the central server can consume an excessive amount of resources when the number of agents is very large or when the resources are very scarce. For example, in a network monitoring and analysis system involving a large number of endpoint devices, the communications of the endpoint devices with a central controller or other central server can represent a significant traffic burden on the network. As another example, sensor agents may have only very limited power supply capacity, and so their communications with a central server should be limited so as to conserve this scarce resource.

A known technique for reducing the amount of data sent from agents to a central server in the context of monitoring networked applications is disclosed in J. M. Chambers et al., "Monitoring Networked Applications with Incremental Quantile Estimation," Statistical Science, January 2006. In this approach, agents send partly summarized data to a central server where the aggregation of the various summaries takes place. Each agent fills a data buffer D of size N. When D is full, a quantile buffer Q is updated and D is flushed. Periodically or upon request, Q is sent to the server for aggregation.

It is possible in certain monitoring systems to avoid the use of a central server altogether. An example of a fully distributed monitoring system of this type is disclosed in U.S. Pat. No. 7,031,264, issued Apr. 18, 2006 in the name of inventors A. Adhikari et al. and entitled "Distributed Monitoring and Analysis System for Network Traffic," which is commonly assigned herewith and incorporated by reference herein. In an illustrative embodiment, the agents comprise endpoint devices that collect and process measurement data relating to Voice over Internet Protocol (VoIP) communications, multimedia communications or other types of network traffic. The endpoint devices are advantageously configured to operate in a manner that does not require the use of a centralized controller or other central server.

Despite the above-described techniques, a need remains for further improvements in distributed monitoring involving a central controller or other type of central server, particularly with regard to limiting the frequency at which agents transmit reports or other updates to the central server.

SUMMARY OF THE INVENTION

The present invention in one or more illustrative embodiments provides techniques for reducing the amounts of data that need to be transferred from agents to a central server in a distributed monitoring system.

In one aspect of the invention, a distributed monitoring system comprises a plurality of agents configured for communication with at least one central server. A given one of the agents obtains measurement data, and applies a statistical test to the measurement data. Based on a result of the statistical test, the given agent determines whether or not an update needs to be sent by the agent to the central server. The agent sends the update to the central server if the determination indicates that the update should be sent.

In an illustrative embodiment, the monitoring system comprises a network monitoring and analysis system and the agents comprise endpoint devices of the network monitoring and analysis system. The central server comprises a controller of the network monitoring and analysis system. The measurement data in this embodiment may comprise, for example, jitter, loss, delay or other types of data. Such measurement data can be obtained, by way of example, by processing of VoIP communications transmitted between the endpoint devices. Other embodiments may involve other monitoring environments, such as, for example, distributed monitoring of call centers, processing systems or sensor networks.

In accordance with another aspect of the invention, the given agent may store the measurement data in the form of a buffer of time-value pairs and send to the central server only a particular subset of those pairs as determined based on the result of the statistical test.

By way of example, the statistical test may comprise determining if a distribution of the measurement data differs significantly from a distribution associated with a previous update sent by the given agent to the central server.

As another example, the statistical test may comprise a function of a plurality of variables which provides as its output an indication as to which of a plurality of values of the measurement data should be sent to the central server. If a monitored system is in a steady state, such a function may return the empty set.

Advantageously, the present invention in the illustrative embodiments provides efficient data compression techniques for reducing the amount of data transmitted by agents to a central server in a distributed monitoring system. By limiting the generation of reporting traffic and the consumption of scarce resources, the overhead costs associated with implementation of a distributed monitoring system are considerably reduced.

DETAILED DESCRIPTION OF THE INVENTION

The invention will be illustrated below in conjunction with an exemplary network monitoring and analysis system. It should be understood, however, that the invention is not limited to use with any particular type of distributed monitoring system or configuration of agents, servers or other system elements. Those skilled in the art will recognize that the disclosed techniques may be used in any distributed monitoring application in which it is desirable to reduce the amounts of data transmitted by agents to a central server. For example, the disclosed techniques can be adapted in a straightforward manner for use in distributed monitoring of call centers, processing systems, sensor networks, and in numerous other environments.

The present invention in the illustrative embodiments provides a data compression process that may be implemented in a monitoring system comprising a plurality of agents configured for communication with one or more central servers. A network monitoring and analysis system is one example of a monitoring system of this type, where the agents comprise endpoint devices and the central server comprises a central controller. The data compression process advantageously reduces the amount of data that is transmitted by the agents to the central server, as will be described in greater detail below in conjunction with the flow diagram of FIG. 3.

It is to be appreciated that the term "central server" as used in this context is not intended to imply any particular physical location of the server relative to the agents, but instead should be broadly construed so as to encompass any system element which serves to aggregate or otherwise process data transmitted from multiple distributed agents. For example, a given central server as the term is used herein may be co-located with one or more of the agents, and may share a processing platform with one or more of the agents. Also, a given embodiment of the invention may comprise multiple servers, each of which receives updates from multiple agents. Such servers are intended to be encompassed by the general term "central server" as used herein. Thus, in a given distributed monitoring system, one or more system entities that operate as agents may also serve as central servers for other agents of the system.

Figure 1:
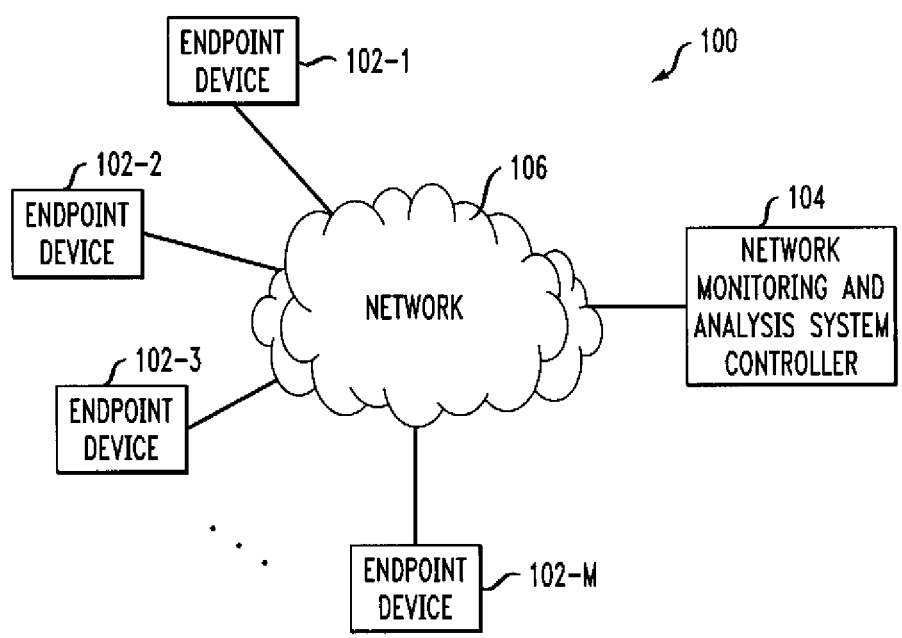
FIG. 1 shows an exemplary communication system in which the invention is implemented.

FIG. 1 shows a network-based communication system 100 that will be used to illustrate the operation of one embodiment of the invention. The system 100 includes an arbitrary number M of endpoint devices 102-$i$, i=1, 2, . . . M, and a network monitoring and analysis system controller 104. Each of the endpoint devices 102 and the controller 104 is coupled to or otherwise associated with a network 106. It should be noted that the variable i is used differently in one or more other contexts herein.

The endpoint devices 102 and controller 104 collectively implement a network monitoring and analysis system. Although particularly useful for monitoring and analysis of VoIP traffic carried by network 106, the network monitoring and analysis system can be used for other types of network traffic, such as video, multimedia, etc. The term "network monitoring and analysis system" as used herein is intended to include a network monitoring system, a network analysis system, or a system capable of both network monitoring and network analysis. Such systems may be implemented at least in part in the form of software running on the endpoint devices 102 and controller 104 of system 100.

Although shown for simplicity of illustration as terminal endpoint devices in the figure, one or more of the endpoint devices of the system may comprise or be otherwise associated with an internal node of network 106. A given endpoint device therefore need not be a terminal device of the system, and may comprise an internal network element such as, for example, a gateway, a router, a switch, or any other type of non-terminal network element. A given pair of endpoint devices in the illustrative embodiment may be viewed generally as comprising the source and destination nodes of a particular communication path. An endpoint device may therefore be a device comprising or otherwise associated with any network node.

The controller 104 may illustratively comprise an otherwise conventional controller of a network monitoring and analysis system, implemented in or otherwise utilized in conjunction with the system 100.

The network monitoring and analysis system of FIG. 1 may include features of known network monitoring and analysis systems, such as the ExpertNet™ network readiness assessment tool from Avaya Inc. of Basking Ridge, N.J., USA. Conventional aspects of this tool and other network monitoring and analysis systems are well-known in the art, and therefore will not be further described herein.

As indicated previously, the endpoint devices may be viewed as examples of what are more generally referred to herein as agents, and the controller may be viewed as an example of what is more generally referred to herein as a central server.

The network monitoring and analysis system may be configured to provide automated determination of particular locations associated with one or more performance problems in the network 106, as described in U.S. Patent Application Publication No. 2005/0053009, entitled "Method and Apparatus for Automatic Determination of Performance Problem Locations in a Network," which is commonly assigned herewith and incorporated by reference herein. For example, a root cause analysis function can be provided that permits the automatic determination of performance problem locations in the network 106.

In such an arrangement, test communications are generated in accordance with a selected pattern, and end-to-end path measurement data is collected utilizing the generated test communications. The test communications may be directed between pairs of the endpoint devices 102 as specified in the selected pattern. The end-to-end path measurement data may be transformed to produce performance indicators for respective non-end-to-end paths defined at least in part by the selected pattern. This approach provides a particularly efficient and accurate mechanism for generating link-level performance indicators in a network, thereby permitting a better understanding of network behavior.

Further aspects of network monitoring and analysis systems that may be utilized in conjunction with the present invention are described in, for example, U.S. patent application Ser. No. 10/270,011, entitled "Report Generation and Visualization Systems and Methods and Their Use in Testing Frameworks for Determining Suitability of a Network for Target Applications," U.S. patent application Ser. No. 10/270,335, entitled "Network Topology Discovery Systems and Methods and Their Use in Testing Frameworks for Determining Suitability of a Network for Target Applications," and U.S. patent application Ser. No. 10/270,122, entitled "Network Traffic Generation and Monitoring Systems and Methods for Their Use in Testing Frameworks for Determining Suitability of a Network for Target Applications," all filed on Oct. 15, 2002, the disclosures of which are incorporated by reference herein.

Additional details regarding possible network monitoring and analysis system features that may be implemented in the system 100 are described in U.S. patent application Ser. No. 10/261,431, filed Sep. 30, 2002 and entitled "Communication System Endpoint Device With Integrated Call Synthesis Capability," U.S. Pat. No. 7,031,264, issued Apr. 18, 2006 and entitled "Distributed Monitoring and Analysis System for Network Traffic," and U.S. patent application Ser. No. 10/460,700, filed Jun. 12, 2003 and entitled "Method and Apparatus for Determination of Network Topology," the disclosures of which are incorporated by reference herein.

Although system 100 is shown as including a centralized controller 104 in FIG. 1, this should not be construed as a requirement of the invention. The invention can alternatively be implemented using a distributed monitoring and analysis system as described in the above-cited U.S. Pat. No. 7,031, 264, or using a combination of centralized and distributed techniques. The term "controller" as used herein is therefore intended to include a centralized controller, a distributed controller, or a hybrid controller which is at least partially centralized and at least partially distributed. Also, as indicated above, one or more endpoint devices or other agents may operate as a controller or other central server in a given embodiment of the invention.

The endpoint devices 102 may be otherwise conventional wired or wireless IP telephones (including devices commonly referred to as IP "softphones"), personal digital assistants (PDAs), mobile telephones, personal computers (PCs), single-board computers (SBCs) or other types of processing devices, suitably configured for interaction with the controller 104 in providing various functions of the network monitoring and analysis system.

It should be noted that the endpoint devices 102 are each typically configured to operate as both receiver and transmitter, as in the case of a bidirectional VoIP communication established between a given pair of endpoints. Conventional aspects of such endpoint devices are well-known in the art and therefore not described in further detail herein.

One or more of the endpoint devices 102 may comprise so-called "synthetic" devices which generate test communications in the form of synthesized calls but are not configured for use in placing actual calls. Also, one or more of the endpoint devices may comprise devices suitable for use in placing actual calls and also capable of generating test communications in the form of synthesized calls. Additional details regarding devices of the latter type can be found in the above-cited U.S. patent application Ser. No. 10/261,431.

Additional system elements, not shown in FIG. 1, may be coupled between each of the endpoints 102 and the network 106, or otherwise arranged within the system 100, in accordance with conventional practice.

Network 106 may represent, e.g., a global communication network such as the Internet, a wide area network, a metropolitan area network, a local area network, a wireless cellular network, a public switched telephone network (PSTN), or a satellite network, as well as portions or combinations of these or other communication networks. The network 106 may comprise conventional IP routers, gateways, switches or other packet processing elements.

Standard protocols that are commonly utilized in VoIP communications include User Datagram Protocol (UDP), described in Internet Engineering Task Force (IETF) Request for Comments (RFC) 768, "User Datagram Protocol," August 1980, http://www.ietforg/rfc/rfc768.txt, Real-Time Transport Protocol (RTP), described in IETF RFC 1889, "RTP: A Transport Protocol for Real-Time Applications," http://www.ietforg/rfc/rfc1889.txt, and RTP Control Protocol (RTCP), described in IETF RFC 3158, "RTP Testing Strategies," August 2001, all of which are hereby incorporated by reference herein.

By way of example, VoIP communications between the endpoints 102 may comprise RTP voice data packets that are sent over an IP network using UDP. More particularly, the RTP packets are encapsulated in UDP packets which are themselves encapsulated in IP packets. Of course, a wide variety of protocols and encapsulation arrangements may be used in implementing the invention.

The endpoints 102 may thus send VoIP communications to one another and report corresponding measurement data to the controller 104. This reporting may involve sending copies of RTCP packets to the controller.

Signaling protocols utilizable in conjunction with VoIP communications to provide functions such as call setup, teardown and dial tone include Session Initiation Protocol (SIP), described in IETF RFC 3261, "SIP: Session Initiation Protocol," June 2002, http://www.ietf.org/rfc/rfc3261.txt, International Telecommunication Union-Telecommunication Standardization Sector (ITU-T) Recommendation H.323, "Packet-based multimedia communication systems," November 2000, and ITU-T Recommendation H.225, "Call signaling protocols and media stream packetization for packet-based multimedia communication systems," November 2000, all of which are incorporated by reference herein.

VoIP communications or other communications in the context of the present invention may be implemented utilizing one or more of the above-cited protocols, or other suitable protocols, as will be readily apparent to those skilled in the art.

It should be emphasized that the simplified configuration of the system 100 as shown in FIG. 1 is for purposes of illustration only, and should not be construed as limiting the invention to any particular arrangement of elements. For example, the system 100 may include additional endpoints, comprising other types and arrangements of routing elements, switching elements or other types of processing elements.

Figure 2:
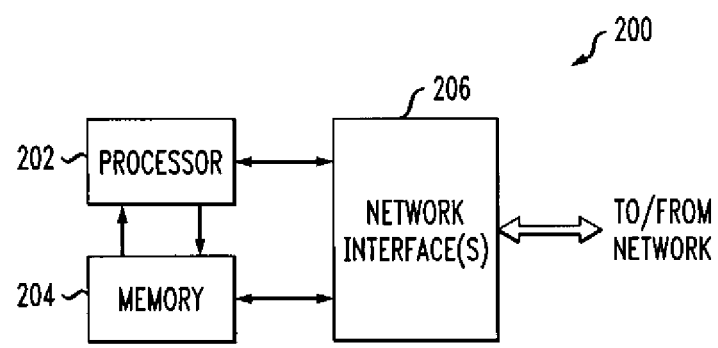
FIG. 2 is a simplified block diagram showing one possible implementation of an endpoint device, controller or other processing element of the FIG. 1 system.

FIG. 2 shows one possible implementation of a given processing element 200 of the FIG. 1 system. The processing element 200 may represent, by way of example, at least a portion of a given one of the endpoint devices 102, at least a portion of the controller 104, or at least a portion of another processing device of the system.

The processing element 200 as shown in the figure includes a processor 202 coupled to a memory 204 and one or more network interfaces 206. The techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as combinations thereof. The individual elements of FIG. 2 as shown for illustrative purposes may be combined into or distributed across one or more processing devices, e.g., a microprocessor, an application-specific integrated circuit (ASIC), a computer or other device(s). It should be appreciated that the FIG. 2 arrangement is considerably simplified for purposes of illustration, and may include other conventional elements.

As indicated above, the network monitoring and analysis system implemented in the network-based communication system 100 of FIG. 1 incorporates a data compression process. An exemplary implementation of the data compression process will now be described with reference to the flow diagram of FIG. 3.

The data compression process in this embodiment generally involves using statistical tests at the endpoint devices 102 to determine whether any transmission is necessary to update the controller 104. This can significantly reduce the overhead associated with the network monitoring and analysis system, without impacting the ability to detect important changes soon after they take place. If the monitored network is in control, that is, operating within certain prescribed ranges defined by the statistical tests, the monitoring overhead can be reduced to almost nothing. The statistical tests in question could be selected according to what the network monitoring and analysis system is trying to detect. As will be described in greater detail below, possibilities include simple control charts for mean or dispersion of a particular set of measurement data or a rank-based test such as the Mann-Whitney test which can detect a change in distribution.

The term "update" as used herein is intended to be construed broadly. A given update may comprise, as indicated previously, a report characterizing certain measurement data, or at least a portion of the measurement data itself, such as time-value pairs to be described in greater detail below. Another example of a possible update that may be sent from an agent to a central server in a given embodiment of the invention includes codes or other messages characterizing measurement data.

Referring now to the particular steps of the flow diagram, in step 300 a given one of the endpoint devices 102 obtains measurement data. The term "measurement data" as used herein is intended to include, for example, jitter, loss, delay or other quality of service (QoS) related statistics, associated analysis results determinable therefrom, as well as other types of data. Such measurement data can be obtained, by way of example, by processing of test communications transmitted between the endpoint devices using techniques described in the above-cited U.S. patent applications. Measurement data may thus be, for example, proactively collected using test communications, or may be based on actual calls or other communications, such as RTCP data collected during actual VoIP calls.

In step 302, the endpoint device applies a designated statistical test to the measurement data. Based on one or more results of the statistical test, the endpoint device determines whether or not an update needs to be sent to the controller, as indicated in step 304. If the results indicate that an update should be sent, an update is sent to the controller in step 306, and the process returns to step 300 to process additional measurement data. If the results indicate that an update does not need to be sent, the update is not sent, as indicated in step 308, and the process instead returns directly to step 300 to process additional measurement data.

Assume the endpoints $1 \leq i \leq M$ are observing values $X_{ij}$ at times $t_{ij}$ for $j \geq 1$. In a given implementation, each of the endpoints 102 may maintain a buffer of K time-value pairs and send to the server a subset L of those pairs whenever the distribution of the K most recent values justify a transmission. For example, the endpoints could send a sample when the distribution of recent values from the measurement data differs significantly from the distribution of values that was last reported by the endpoint. The statistical test in this case may be a Mann-Whitney test, or any other statistical test that is capable of detecting a significant change in the distribution of the values in the measurement data.

As another example, the statistical test may involve determining which of the recent values should be sent to the server. This may be viewed as finding a function $f$ of K variables that indicates which of the buffered values should be sent to the server. In a steady state, the function $f$ would return the empty set. The function $f$ could be selected so that the server can estimate various parameters efficiently.

Other types of statistical tests may include, for example, tests that are designed to trigger on designated thresholds or on rapid progressions or other statistical characteristics of the measurement data. A given update may also or alternatively be sent if a number of specified conditions are met or if a particular period of time has elapsed since a prior update.

A more particular example of a given statistical test that may be applied in step 302 of the FIG. 3 data compression process will now be described. This example is a type of Mann-Whitney test, also referred to as a U test or a Wilcoxon rank-sum test. In this example, there are two samples, $x_1, \ldots, x_n$ and $y_1, \ldots, y_m$, one from each of two populations. Define U as the sum over i and j of the number of $x_i$ that are greater than $y_j$. Thus, the sum increases by one if a given $x_i$ is greater than a given $y_j$ and by zero otherwise, so as to count the number of $x_i$ that are greater than $y_j$. In other words, for each i, count how many among $y_1, \ldots, y_m$ are less than $x_i$. If the resulting count is denoted $r_i$, U is the sum of all $r_i$. The smallest value of U is 0 and the largest is nm.

The hypothesis $H_0$ stipulates that the two populations are the same. The U test rejects the $H_0$ hypothesis if U is "too far" from nm/2, that is, too small or too large. How far is a parameter that controls how sensitive the test is, that is, how many false alarms are generated when $H_0$ is true. If $H_0$ is true, then the distribution of U centers at nm/2 with a variance of nm(1+n+m)/12. The distribution of U under $H_0$ can be used to calibrate the test. Define $z=(U-nm/2)/sqrt(nm(1+n+m)/12)$. The hypothesis $H_0$ can be rejected, for example, whenever $|z|>2.0$. This particular choice (the number 2.0) would result in a test that generates only about 5% false alarms. Larger values such as 3.0 would result in a less sensitive test with fewer false alarms.

The above statistical test example is based on the so-called large sample approximation of the Mann-Whitney U test null distribution. As will be appreciated by those skilled in the art, tables may be used to obtain the exact distribution.

Again, the use of a Mann-Whitney test is provided for purposes of illustration only. A wide variety of other types of statistical tests may be used in implementing the invention.

As indicated previously, network overhead can become a significant problem in practice. The data compression process of FIG. 3 is advantageously configured to reduce the network overhead by basing transmission decisions on statistical tests of the measurement data. In the illustrative embodiment the endpoint devices maintain buffers of values and determine which time-value pairs should be sent to the server. Thus, if the monitored network is in steady state, that is, under control with no significant measurement data to be reported based on the statistical tests, the network overhead can be reduced to zero. Moreover, important changes in the measurement data are quickly reported to the server. This can serve to reduce response times in real-time monitoring scenarios in which some automatic or human-initiated action can result from a change in monitored values.

Figure 3:
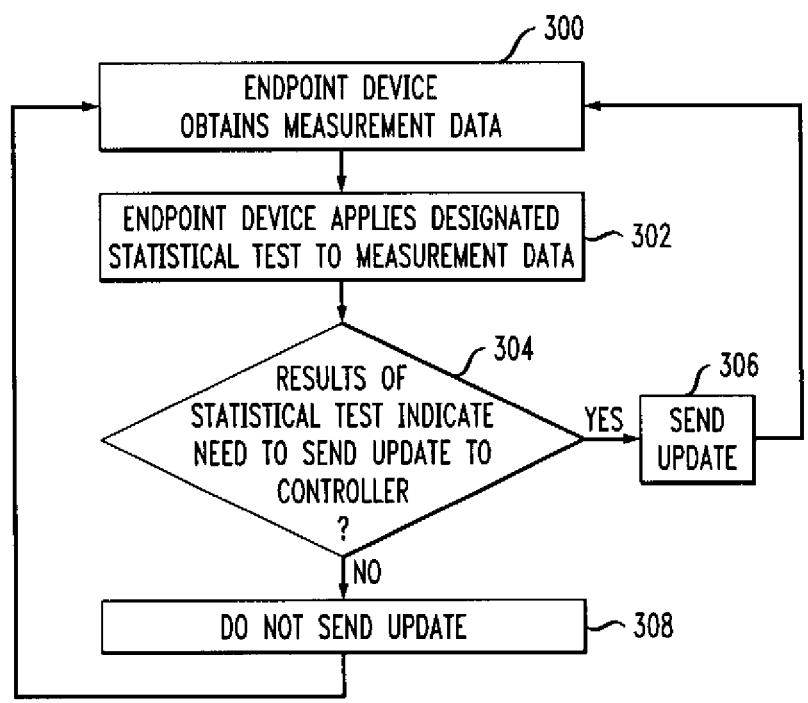
FIG. 3 is a flow diagram of a data compression process implemented in the system of FIG. 1 in accordance with an illustrative embodiment of the invention.

In the illustrative embodiments of FIGS. 1 to 3, the monitoring system comprises a network monitoring and analysis system having endpoint devices 102 and a controller 104. In such an environment, the endpoints send VoIP communications to one another and report measurement data to the controller, as was previously described. This reporting may involve sending copies of RTCP packets to the controller. The statistical testing of step 302 in the data compression process of FIG. 3 may be used to control the transmission of such RTCP packets to the controller, so as to significantly reduce the network overhead. For example, a given endpoint device or other agent could send only the first few RTCP packets, and then send additional packets only when there is evidence of a significant change based on a statistical test.

The disclosed techniques can also facilitate determination of network performance relative to a service level agreement (SLA) for the locations where the monitoring endpoint devices are located. Such SLAs are often expressed in terms of a distribution for end-to-end packet transit times over stipulated periods of time. A signatory of the agreement will therefore typically want to monitor the end-to-end packet transit times and document any violations of the agreement. In such a situation it may be desirable to detect the violations quickly in order to take corrective action before too much damage is done.

As indicated previously, the disclosed techniques are more generally applicable to other monitoring environments which comprise distributed agents configured for communication with one or more central servers, such as distributed monitoring of call centers. A given call center, also referred to as a contact center, may comprise agents located at many geographically distributed sites but with their work assignments handled through a common application routing communications among the sites and agents. A monitoring system in such an environment may monitor data such as umber of calls handled by particular agents, length of calls, etc. The data compression process of FIG. 3 may be adapted in a straightforward manner for implementation in a call center monitoring application, as well as in other monitoring environments, including monitoring in distributed processing systems and sensor networks.

As previously noted, the data compression process described above in conjunction with the illustrative embodiments of the invention may be implemented in whole or in part in software utilizing processor 202 and memory 204 associated with a given endpoint device. Other suitable arrangements of hardware, firmware or software may be used to implement the techniques of the invention.

It should again be emphasized that the above-described arrangements are illustrative only. For example, alternative embodiments may involve different agent or server configurations and different distributed monitoring environments than those specifically shown. Also, the particular processing steps, measurement data and statistical tests associated with the data compression process in the illustrative embodiments may be varied in other embodiments. These and numerous other alternative embodiments within the scope of the following claims will be apparent to those skilled in the art.

What is claimed is:

1. A method comprising:
   obtaining a first set of measurements by a first agent, the first set of measurements being associated with a quality-of-service metric of a communication path between the first agent and a second agent measured at a first time;
   sending a first update associated with the first set of measurements from the first agent to a central server at a second time later than the first time;
   obtaining a second set of measurements by the first agent, the second set of measurements being associated with the quality-of-service metric of the communication path measured at a third time later than the second time; and
   sending a second update associated with the second set of measurements from the first agent to the central server at a fourth time later than the third time when the first agent determines that a distribution of the first set of measurements differs from a distribution of the second set of measurements, wherein the second update comprises at least one of (i) a report characterizing the first set of measurements, (ii) a portion of the first set of measurements, (iii) a code characterizing the first set of measurements, and (iv) a message characterizing the first set of measurements.

2. The method of claim 1, wherein the first agent is part of a network monitoring and analysis system.

3. The method of claim 2, wherein the central server comprises a controller of the network monitoring and analysis system.

4. The method of claim 1, wherein the first agent stores the second set of measurements as a buffer of time-value pairs and sends to the central server a subset of the time-value pairs as part of the second update.

5. The method of claim 1, wherein the second set of measurements is real-time protocol control protocol data collected during voice over Internet protocol calls.

6. The method of claim 1, further comprising applying a Mann-Whitney test to the second set of measurements.

7. The method of claim 1, further comprising determining which of a plurality of stored values of the second set of measurements should be sent to the central server.

8. The method of claim 1, wherein:
   the second set of measurements comprises a plurality of values,
   the second update comprises a subset of the plurality of values, and
   the second update depends on a function that provides as its output an indication as to which values from the plurality should be sent to the central server.

9. The method of claim 8, wherein the function returns an empty set when a monitored system is in a steady state.

10. The method of claim 1, wherein the second update comprises a real-time protocol control protocol packet.

11. The method of claim 1, wherein the quality-of-service metric comprises one of jitter, loss, and delay.

12. A system comprising:
   a central server; and
   a plurality of agents configured for communication with the central server, wherein a first agent from the plurality of agents:
      obtains a first set of measurements associated with a quality-of-service metric of a communication path between the first agent and a second agent from the plurality measured at a first time;
      sends a first update of the first set of measurements to the central server at a second time later than the first time;
      obtains a second set of measurements associated with the quality-of-service metric of the communication path measured at a third time later than the second time;
      applies a statistical test to the second set of measurements, wherein the statistical test compares the second set of measurements to the first set of measurements;
      determines, based on a result of the statistical test, whether or not a second update needs to be sent to the central server to yield a determination; and
      based on the determination, sends the second update to the central server at a fourth time later than the third time, wherein the first agent stores the second set of measurements as a buffer of time-value pairs and sends to the central server a subset of the time-value pairs based on the result of the statistical test.

13. The system of claim 12, wherein the plurality of agents and the central server collectively implement a network monitoring and analysis system.

14. The system of claim 13, wherein the central server comprises a controller of the network monitoring and analysis system.

15. The system of claim 12, wherein the quality-of-service metric comprises one of jitter, loss, and delay.

16. The system of claim 12, wherein the second update comprises one of (i) a report characterizing the first set of measurements, (ii) a portion of the first set of measurements, (iii) a code characterizing the first set of measurements, and (iv) a message characterizing the first set of measurements.

17. A computer-readable storage device storing instructions which, when executed by a processor, cause the processor to perform operations comprising:
- obtaining a first set of measurements by a first agent, the first set of measurements being associated with a quality-of-service metric of a communication path between the first agent and a second agent measured at a first time;
- sending a first update of the first set of measurements from the first agent to a central server at a second time later than the first time;
- obtaining a second set of measurements by the first agent, the second set of measurements being associated with the quality-of-service metric of the communication path measured at a third time later than the second time; and sending a second update from the first agent to the central server at a fourth time later than the third time when the first agent determines that a distribution of the first set of measurements differs from a distribution of the second set of measurements, the second update being associated with the first update, wherein the second set of measurements comprises a plurality of values and the second update comprises a portion of the plurality of values, and wherein the second update depends on a function that provides as its output an indication as to which values from the plurality should be sent to the central server.

18. The computer-readable storage device of claim 17, wherein the quality-of-service metric comprises one of jitter, loss, and delay.

* * * * *